United States Patent [19]

Satoh

[11] 4,189,636
[45] Feb. 19, 1980

[54] TAPE RECORDER PROVIDED WITH A COUNT DISPLAY FOR COUNTING AND DISPLAYING A NUMBER OF REEL ROTATIONS

[75] Inventor: Ken Satoh, Hachioji, Japan

[73] Assignee: Olympus Optical Co., Ltd., Tokyo, Japan

[21] Appl. No.: 886,442

[22] Filed: Mar. 14, 1978

[30] Foreign Application Priority Data

Mar. 15, 1977 [JP] Japan .............................. 52/31175[U]

[51] Int. Cl.² ............................................... G06M 3/14
[52] U.S. Cl. ........................ 235/92 MP; 235/92 EV; 235/92 CP; 364/705
[58] Field of Search ....... 235/92 EV, 92 DN, 92 MP, 235/92 CP; 360/137, 72; 242/191; 33/137; 364/705

[56] References Cited

U.S. PATENT DOCUMENTS

| | | | |
|---|---|---|---|
| 3,654,449 | 4/1972 | Boyce | 235/92 DN |
| 3,681,575 | 8/1972 | Wolfe | 235/92 MP |
| 3,834,648 | 9/1974 | Rose et al. | 235/92 DN |
| 3,965,340 | 6/1976 | Renner et al. | 235/92 DN |
| 4,021,828 | 5/1977 | Iura et al. | 235/92 EV |
| 4,044,233 | 8/1977 | Sato | 235/92 DN |

FOREIGN PATENT DOCUMENTS 2340373 2/1975 Fed. Rep. of Germany ........... 364/705

*Primary Examiner*—Joseph M. Thesz

[57] ABSTRACT

A tape recorder provided with means for indicating a number of reel rotations comprises a pulse generator for producing a pulse signal having pulses in a number proportional to a number of tape reel rotations. The pulses issued from the pulse generator and shaped by a wave-shaping circuit and conducted to a counter, which counts a number of pulses proportional to the tape reel rotations. The contents of the counter are indicated on an electronic digital display device.

3 Claims, 3 Drawing Figures

TAPE RECORDER PROVIDED WITH A COUNT DISPLAY FOR COUNTING AND DISPLAYING A NUMBER OF REEL ROTATIONS

BACKGROUND OF THE INVENTION

This invention relates to a tape recorder provided with a counter, and more particularly to a tape recorder designed to count a number of tape reel rotations and equipped with an indicator for electronically displaying a number of counted tape reel rotations.

A tape recorder provided with a counter has already been developed. However, the conventional counter mechanically counts a number of tape reel rotations, thus failing to be made compact beyond a certain extent. Recently, a considerably compact tape recorder has come to be commercially available due to technical development. Since, however, a midget counter has not been developed, the known compact tape recorder lacks a counter. Therefore, inconvenience was experienced in detecting that section of a magnetic tape which it was desired to reproduced. Where equipped with a mechanical counter, a tape recorder unavoidably becomes bulky. Further, a tape recorder motor should have a large torque to drive the mechanical counter, eventually leading to consumption of large power. Moreover, the mechanical counter which is subject to gross counting errors makes it difficult exactly to find that section of a magnetic tape which it is desired to reproduce.

SUMMARY OF THE INVENTION

It is accordingly the object of this invention to provide a tape recorder provided with a count display device for counting and displaying a number of tape reel rotations, which enables to be miniaturized.

According to this invention, there is provided a tape recorder which comprises a pulse generator for producing a pulse signal having pulses in a number proportional to tape reel rotations; a counter for counting the pulses issued from the pulse generator; and an electronic display device for digitally indicating the contents of the counter.

DESCRIPTION OF THE PREFERRED EMBODIMENTS

Figure 1:
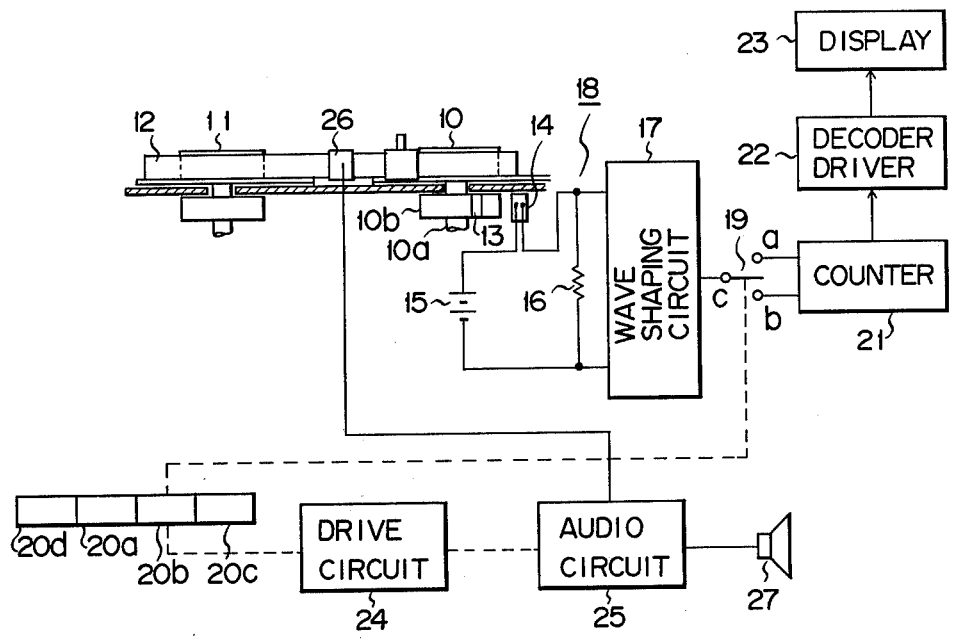
FIG. 1 is a block circuit diagram of a tape recorder according to one embodiment of this invention which is provided with means for counting and displaying a number of tape reel rotations.

FIG. 1 shows a tape makeup reel 10, a rewind reel 11 and a magnetic tape 12 wound about the tape takeup and rewind reels 10 and 11. A rotor 10b is directly coupled to the rotary shaft 10a of the tape takeup reel 10. A permanent magnet 13 is provided in part of the periphery of the rotor 10b. A leaf switch 14 is disposed near the periphery of the rotor 10b. This leaf switch 14 is connected in series to a D.C. power source 15. A resistor 16 is connected in parallel to a series circuit formed of the leaf switch 14 and D.C. power source 15. Both terminals of the resistor 16 are connected to the input terminals of a wave-shaping circuit 17. The leaf switch 14, D.C. power source 15, resistor 16 and wave-shaping circuit 17 may be regarded collectively to constitute a pulse generator 18 for sending forth a pulse signal having pulses in a number proportional to a number of tape reel rotations. The output terminal of the wave-shaping circuit 17 or pulse generator 18 is connected to a common contact C of a changeover switch 19. This changeover switch 19 has its operation shifted interlockingly with the depression of any of a record button 20a, reproduction button 20b, stop button 20c and rewind button 20d. The contacts a, b of the changeover switch 19 are connected to the up-counting and down-counting terminals of an up-down counter 21. The output terminal of this up-down counter 21 is connected to, for example, a semiconductor display device 23 through a decoder driver 22.

A driver circuit 24 drives the mechanical device of the tape recorder to effect the recording, reproduction, stop and rewinding in response to the selective depression of the buttons 20a, 20b, 20c, and 20d. An audio circuit 25 undertakes the recording and reproduction of a magnetic tape 12 through a magnetic head 26 and causes reproduced sounds to be given off through a loud-speaker 27.

Where, under the above-mentioned arrangement, the record bottom 20a, for example, is depressed to set a tape recorder for a recording made, then the takeup reel 10 and rewind reel 11 are rotated.

When the takeup reel 10 is rotated, then the rotor 10b coupled to the rotary shaft 10a of the takeup reel 10 is turned. The magnet 13 provided on the rotor 10b closes the leaf switch 14, each time the rotor 10b makes one rotation. A voltage pulse is generated between both terminals of the resistor 16, each time the leaf switch 14 is closed. The voltage pulse is shaped by the wave-shaping circuit 17 and then is conducted to the common contact c of the changeover switch 19. Upon depression of the record button 20a, the common contact c of the changeover switch 19 is brought into contact with the contact a connected to the up-counting terminal of the up-down counter 21. Therefore, pulses sent forth in turn from the wave-shaping circuit 17 in response to the close actuations of the leaf switch 14 are counted up by the up-down counter 21. A value counted by the counter 21 is converted into 7-segment display signals by the decoder 22, and displayed on a semiconductor display device, for example, a light-emitting device (LED) type display device 23.

Where it is desired to carry out the reproduction of a tape recorder by rewinding a magnetic tape whose recording has been brought to an end up to the prescribed position of the tape, then it is advised to depress the rewind button 20d. At this time, the common contact c of the changeover switch 19 is brought into contact with the contact b connected to the down-counting terminal of the up-down counter 21. At the result, the pulse sent forth from the wave-shaping circuit 17 at each reverse rotation of the rotor 10b is supplied to the down-counting terminal of the up-down counter 21, which carries out down-counting in response to the pulse received. Values down-counted by the up-down counter 21 now set for a down-counting mode are successively indicated on the display device 23 through the decoder 22. Where, therefore, the stop button 20c is depressed when the display device 23 indicates a prescribed down-counted value, then a tape recorder can be brought to rest at the desired position.

As mentioned above, a tape recorder embodying this invention is provided with a tape reel rotation count display device for electrically counting and electronically displaying a number of tape reel rotations. This count display device can correctly detect a number of tape reel rotations and further be considerably reduced in size, thereby rendering the tape recorder of the invention very compact as a whole.

Figure 2:
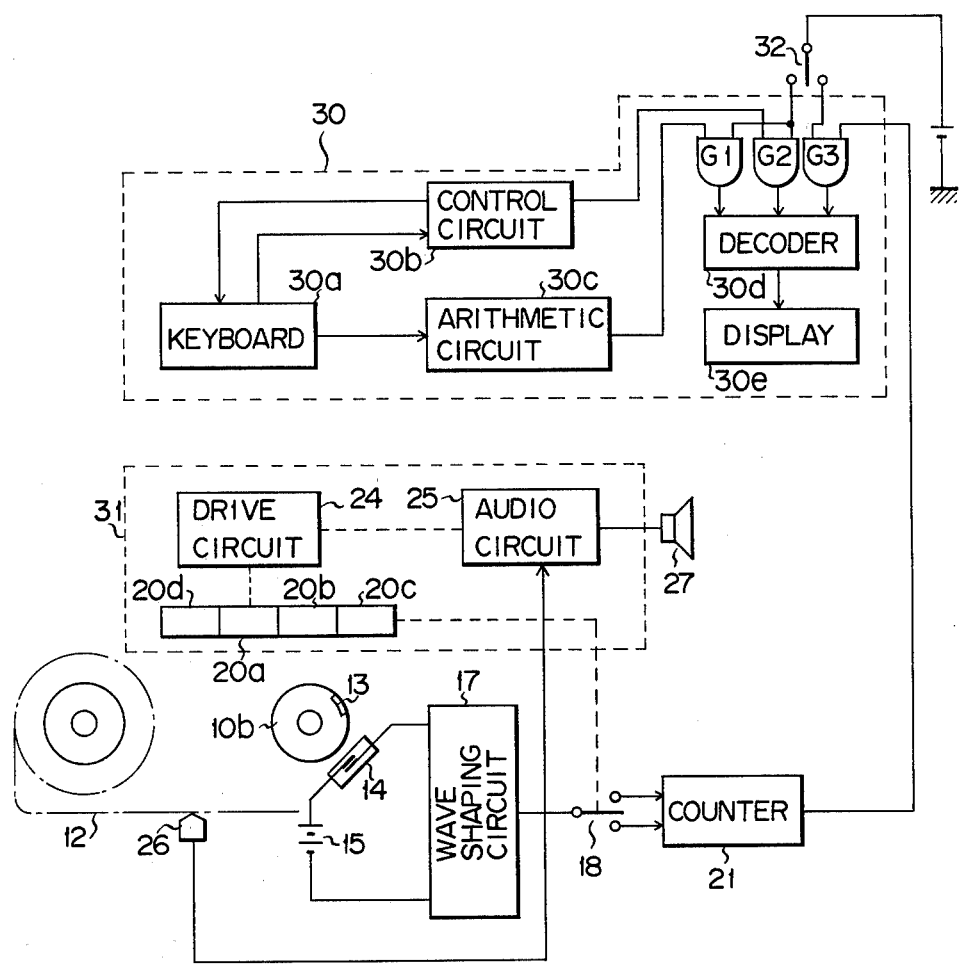
FIG. 2 is a block circuit diagram of a tape recorder according to another embodiment of the invention, which is assembled with a desk top calculator.

There will now be described by reference to FIG. 2 a tape recorder integrally fitted with a desk top calculator. A number of tape reel rotations is indicated by utilizing the display device of the desk top calculator. The embodiment of FIG. 2 represents an assembly of a desk top calculator section 30 and a tape recorder body 31. The desk top calculator section 30 comprises a keyboard 30a, control circuit 30b, arithmetic circuit 30c, decoder driver 30d and display device 30e, and has substantially the same circuit arrangement as the ordinary desk top calculator. AND gates $G_1$, $G_2$, $G_3$ are provided to connect the display device 30 to either for the desk top calculator section 30 or for the tape recorder body 31 in response to the switching operation of a changeover switch 32.

The tape recorder body 31 comprises the drive circuit 24, audio circuit 25, record button 20a, reproduction button 20b, stop button 20c and rewind button 20d.

Where, with the embodiment of FIG. 2, output pulses from the pulse generator 18 or the wave-shaping circuit 17 are supplied to, for example, the up-counting terminal of the up-down counter 21, then this counter 21 is set for an up-counting mode as in the case of FIG. 1. An output count signal from the up-down counter 21 is conducted to the AND gate $G_3$. Where, at this time, the common contact c of the changeover switch 32 is connected to the contact b, then the AND gate 3 is opened to cause an output count signal from the up-down counter 21 to be sent forth to the display device 30e through the decoder driver 30d. Where the common contact c of the changeover switch 32 is connected to the contact a, then the gate $G_3$ is closed. Instead, the gates $G_1$, $G_2$ are opened to display information supplied by the desk top calculator section 30.

A tap recorder according to the embodiment of FIG. 2 in which a desk top calculator is incorporated offers the advantage of simplifying the arrangement, decreasing the cost and rendering the whole assembly very compact, because the tape recorder serves the double purpose of acting as both taper recorder and desk top calculator, and a number of tape reel rotations is indicated by utilizing the display device of the desk top calculator. This desk top calculator type tape recorder can be assembled as illustrated in FIG. 3.

Figure 3:
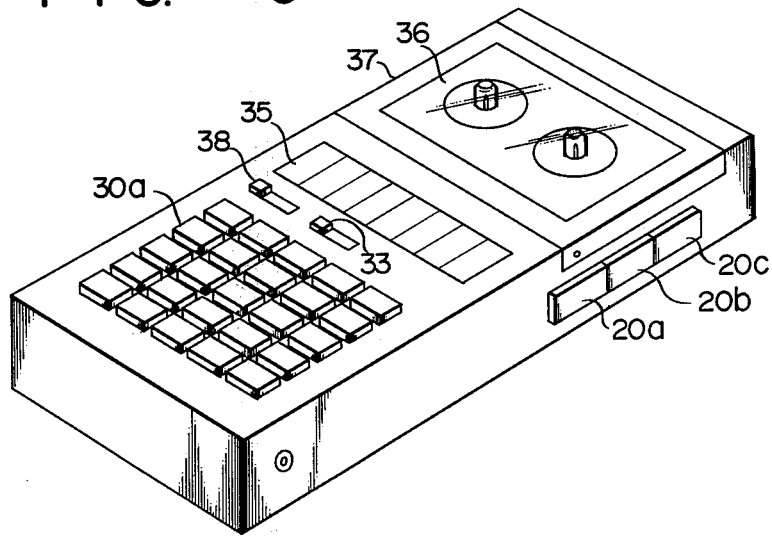
FIG. 3 is an oblique view of the assembly of FIG. 2.

Referring to FIG. 3 a display panel 35 of the display device 30e is positioned approximately at the center of the front section of the assembly. A cassette chamber 36 holding a magnetic tape cassette is provided on the upper part of the front section of the assembly, and is normally enclosed in a cover 37. A keyboard 30a of the desk top calculator 30 is formed on the lower part of the front section of the assembly. A display device changeover switch 33 and power supply switch 38 are set between the display panel 35 and keyboard 30a. One lateral side of the assembly is fitted with the record button 20a, reproduction button 20b and stop button 20c.

With the foregoing embodiments, a number of tape reel rotations is detected by means of a permanent magnet 13 mounted on the rotor 10b coupled to the takeup reel 10 and the leaf switch 14 actuated by the permanent magnet 13. However, the detection may be optically effected by applying light-emitting and light-sensitive elements. Also, the pulse generator may be so constituted as to generate a plurality of pulses at each rotation of the rotor associated with the reel.

What is claimed is:

1. A tape recorder in which are incorporated:
   (a) a tape recorder body including a mechanical device having at least two tape reels used to take up and rewind a magnetic tape;
   (b) a desk top calculator body including a display device;
   (c) a pulse generator for producing a pulse signal having pulses in a number proportional to a number of the rotations of one of said at least two tape reels; and
   (d) an up-down counter for counting up or down the pulses delivered from the pulse generator in a number proportional to a number of the rotations of the tape reel, according as the tape reel makes a normal or reverse rotation, and wherein an output count signal from the up-down counter is conducted to the display device of the desk top calculator to be displayed thereon.

2. A tape recorder according to claim 4, wherein the pulse generator comprises a rotor rotatable with the tape reel and means for generating at least one electric pulse at each rotation of the rotor.

3. A tape recorder according to claim 4, wherein the up-down counter has up-counting and down-counting terminals; changeover switching means is connected between the up-counting and down-counting terminals of the up-down counter on one hand and the output terminal of the pulse generator on the other, thereby causing the pulse signal issued from the pulse generator to be supplied to the up-counting terminal of the up-down counter during the normal rotation of the tape reel and to the down-counting terminal thereof during the reverse rotation of the tape reel.

* * * * *